United States Patent
Egyed (10) Patent No.: US 8,662,398 B1
(45) Date of Patent: Mar. 4, 2014

(54) OPTICAL MOBILE COMMUNICATIONS

(71) Applicant: Zoltan Egyed, Sunnyvale, CA (US)

(72) Inventor: Zoltan Egyed, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/654,228

(22) Filed: Oct. 17, 2012

(51) Int. Cl.
*G06K 7/10* (2006.01)

(52) U.S. Cl.
USPC ............. 235/462.45; 235/462.01; 235/472.01

(58) Field of Classification Search
USPC .............. 235/462.45, 472.01, 472.02, 462.01
See application file for complete search history.

(56) References Cited

U.S. PATENT DOCUMENTS 6,873,839 B2 * 3/2005 Stanforth .................. 455/343.2
8,256,681 B2 * 9/2012 Wang ....................... 235/472.01

* cited by examiner

*Primary Examiner* — Ahshik Kim
(74) *Attorney, Agent, or Firm* — MH2 Technology Law Group, LLP (57) ABSTRACT

Techniques for optical communication between devices are presented. The devices can be mobile, for example, mobile phones. The techniques permit one-way or two-way data transfer between devices. The optical communication allows for communication between devices in the absence of a wireless network.

19 Claims, 6 Drawing Sheets

OPTICAL MOBILE COMMUNICATIONS

TECHNICAL FIELD

The techniques provided herein relate to communications between devices.

BACKGROUND

Techniques for transmitting data between mobile devices using radio-frequency communication are known. Such techniques can rely on a wireless router, for example.

SUMMARY

According to some implementations, a method for transferring data between a first device and a second device is presented. The method includes displaying by the first device a sequence of sender patterns, each sender pattern representing data including a sender sequence number, a sender acknowledgement number, and sender payload data. The method also includes obtaining, by a camera of the first device, a sequence of images displayed by the second device, where each image includes a receiver pattern representing data including a receiver sequence number, a receiver acknowledgement number and receiver payload data. The method also includes arranging, based on corresponding receiver sequence numbers, receiver payload data from a plurality of receiver patterns to form received data, and processing the received data at the first device.

The above implementations can optionally include one or more of the following. Each sender pattern can include a matrix code or a bar code. The method can include, prior to the displaying, a handshake method that includes displaying by the first device a first sender pattern, the first sender pattern representing data including a first sender sequence number, obtaining by the first device an acknowledgement image displayed by the second device, of the screen of the second device, where the acknowledgement image includes a first receiver pattern, the first receiver pattern representing data including a function of the first sender sequence number and a first receiver sequence number, and displaying by the first device a second sender pattern, the second sender pattern representing data including a function of the first receiver sequence number and a function of the first sender sequence number. The method can include detecting, by the first device, that the first device is inverted, and initiating the handshake method response to the detecting. The first device can include an accelerometer, where the detecting that the device is inverted includes monitoring a signal from the accelerometer. The method can include detecting, by the first device, that the first device is in a predetermined geographic region, and initiating the handshake method in response to the detecting. The first device can include a GPS module, where the detecting that the device is in a predetermined geographic region includes monitoring a signal from the GPS module. The method can include obtaining data for optical transmission, where the sender payload data for the sequence of sender patterns includes data sufficient to determine the data for optical transmission. The processing can include at least one of: error detecting, decompressing, and executing. The sequence of sender patterns can include a pattern including a throttle parameter. The method can include detecting that the sequence of images displayed by the second device includes a receiver pattern including a throttle parameter indicating an amount, where subsequent sender patterns include sender payload data not exceeding the amount. At least one of the first device and the second device can include a mobile phone.

According to some implementations, a method for transferring data from a first device and a second device is presented. The method includes obtaining data for optical transmission, and displaying, by the first device, a sequence of patterns, each pattern representing data including payload data, where a subset of the sequence of patterns includes payload data sufficient to determine the data for optical transmission, the subset including a plurality of patterns.

The above implementations can optionally include one or more of the following. Each sender pattern can include one of a matrix code and a bar code. The method can include repeating the displaying at least once. The payload data can include data in a digital fountain format. The method can include, prior to the displaying, detecting that a second device is inverted. The method can include, prior to the displaying, detecting that a second device is in a predetermined geographic region. Each pattern can represent data including a sequence number.

According to some implementations, a computer readable media containing instructions is presented. The computer readable media contains instructions, which, when executed by one or more processors of a first device, cause the one or more processors to: display by the first device a sequence of sender patterns, each sender pattern representing data including a sender sequence number, a sender acknowledgement number, and sender payload data, obtain, by the first device, a sequence of images displayed by the second device, where each image includes a receiver pattern representing data including a receiver sequence number, a receiver acknowledgement number and receiver payload data, arrange, based on corresponding receiver sequence numbers, receiver payload data from a plurality of receiver patterns to form received data, and process the received data at the first device.

DESCRIPTION OF DRAWINGS

The accompanying drawings, which are incorporated in and constitute a part of this specification, illustrate implementations of the described technology. In the figures.

DETAILED DESCRIPTION

Mobile devices, such as mobile phones, can communicate with each-other when a wireless network is present, for example, using email. However, in places such as airplanes, a wireless network might not be available. The present disclosure includes techniques that mobile devices can use to communicate using optical, e.g., visual, displays. Communication can be one-way or bi-directional. The communication can utilize displayed patterns, which can encode information.

Reference will now be made in detail to example implementations, which are illustrated in the accompanying drawings. Where possible the same reference numbers will be used throughout the drawings to refer to the same or like parts.

Figure 1:
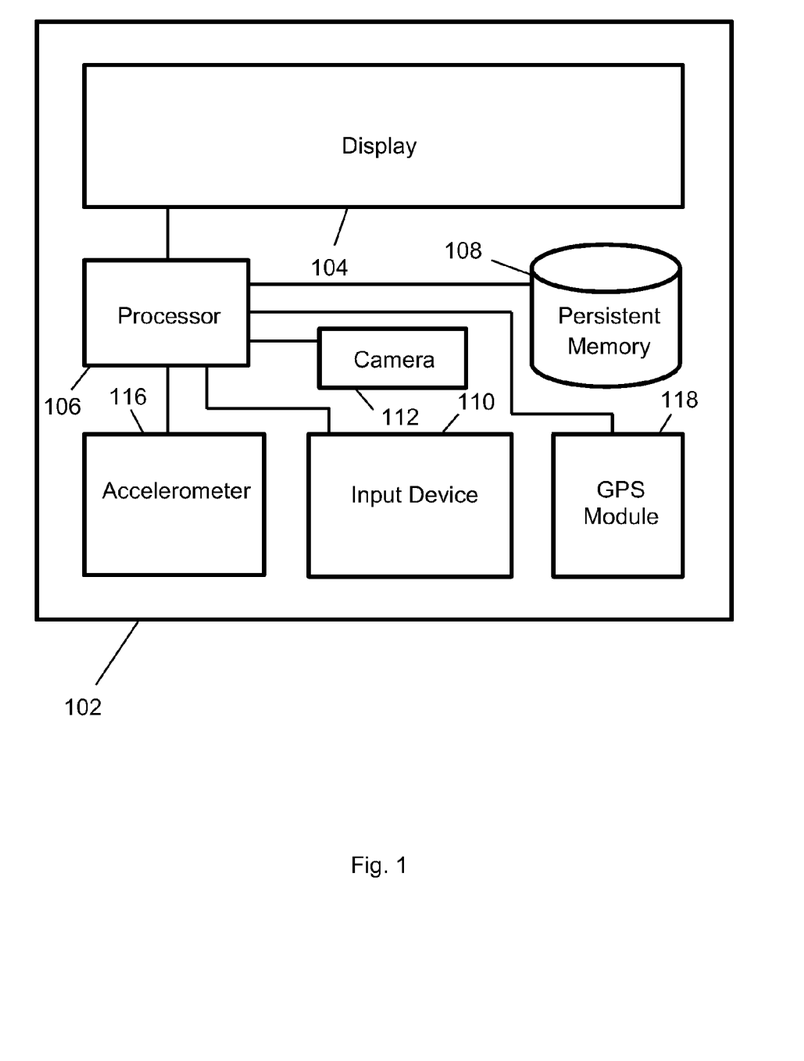
FIG. 1 is a schematic diagram of a device according to some implementations.

FIG. 1 is a schematic diagram of an apparatus according to some implementations. In particular, FIG. 1 illustrates various hardware and other resources that can be used in implementations of certain disclosed implementations. Disclosed implementations can include device 102, which can include processor 106 coupled to a random access memory operating under control of, or in conjunction with, an operating system. Device 102 in some implementations can be a mobile telephone, a smart telephone, a personal digital assistant, a tablet computer, or another computer or hardware resource.

Processor 106 is communicatively coupled to persistent memory 108. In some implementations, processor 106 can be a central processing unit (CPU), application specific integrated circuit (ASIC), field programmable gate array (FGPA), or other processor or group of processors. Persistent memory 108 can be, for example, a local hard drive, a flash memory, or a different type of memory. Persistent memory 108 can store program instructions executable by processor 106 to perform techniques disclosed herein.

As shown in FIG. 1, processor 106 is further communicatively coupled to display 104. Display 104 can be, by way of non-limiting example, a liquid crystal display. In some implementations, display 104 can be a touchscreen. If a touchscreen, display 104 can utilize, by way of non-limiting example, any of the following touchscreen technologies: resistive, surface acoustic wave, capacitive (e.g., surface capacitance, projected capacitance, mutual capacitance or self-capacitance), infrared, optical imaging, dispersive signal technology or acoustic pulse recognition. Further, if a touchscreen, display 104 can include a partial or complete user interface, such as a virtual keyboard. In some implementations, display 104 includes a projector. The projector can be capable of displaying projected images on a surface such as a wall.

FIG. 1 further depicts that processor 106 is further communicatively coupled to input device 110. Input device 110 can be, by way of non-limiting example, a partial or complete physical keyboard (e.g., a keyboard that includes physical, as opposed to virtual, keys). In some implementations, input device 110 can be combined with display 104. As discussed above, display 104 may be implemented using a touchscreen, and in such implementations, the touchscreen can include a virtual partial or complete keyboard as user interface 102.

Processor 106 can be further communicatively coupled to camera 112. Processor 106 may be configured to convert images received via camera 112 into computer-recognizable data (e.g., GIF, JPEG, BMP, etc). Camera 112 may be operably coupled to processor 106, which can process raw data from camera 112 and store an associated image in persistent memory 108.

Processor 106 can be further communicatively coupled to accelerometer 116. Accelerometer 116 can, for example, indicate a position of device 102 relative to the direction of gravity.

Processor 106 can be further communicatively coupled to GPS module 118. Herein, the term "GPS" encompasses GLOBAL POSITIONING SYSTEM, GLONASS, COMPASS and GALILEO satellite positioning systems. GPS module 118 can, for example, indicate a geographic position of device 102.

Figure 2:
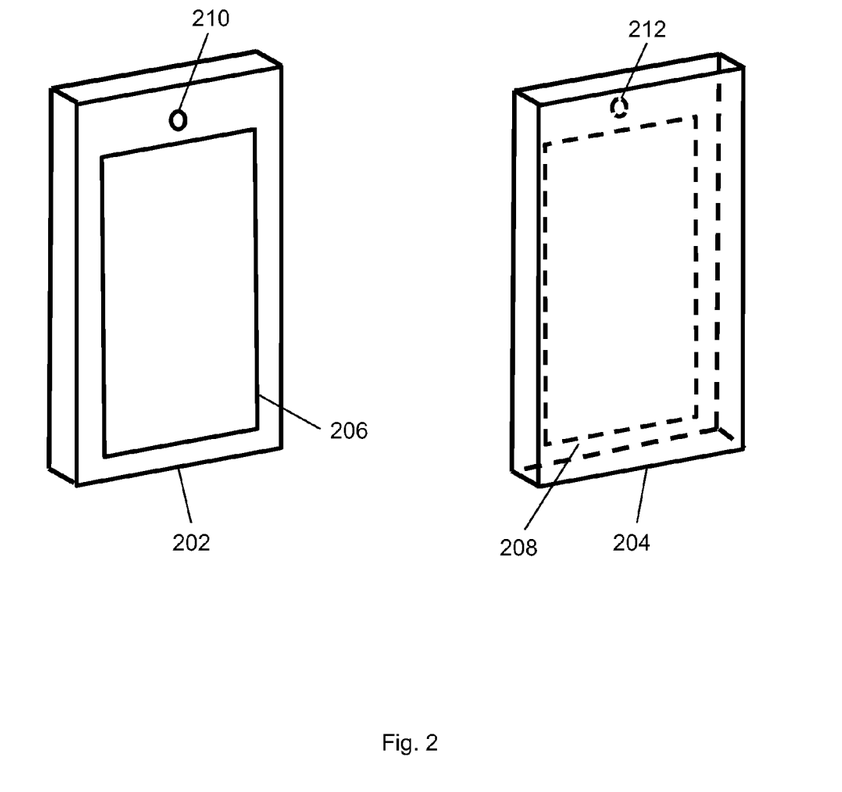
FIG. 2 is a schematic diagram of communicating devices according to some implementations.

FIG. 2 is a schematic diagram of communicating devices according to some implementations. In particular, device 202 includes display 206 and camera 210. Device 204 also includes display 208 and camera 212 (depicted using dotted lines to represent that these features appear on an opposite face of device 204 as shown). A face of device 202, as illustrated, is directed at a face of device 204. In particular, camera 210 of device 202 is positioned so as to capture an image of at least display 208 of device 204. Likewise, camera 202 of device 204 is positioned so as to capture at least an image of display 206 of device 202. In implementations where one or both of display 206 and display 208 include a projector, the schematic diagram of FIG. 2 should be interpreted as depicting that camera 210 and/or camera 212 are configured to capture the corresponding projected display.

In implementations, device 202 can send information to device 204 by showing patterns that encode such information on display 206. Camera 212 of device 204 can capture images of such patterns and decode them to obtain the information sent by device 202. Thus, in some implementations, information can flow in one direction, e.g., from device 202 to device 204. An example of such one-way communications is described below in reference to FIG. 6.

In some implementations, information can flow in two directions, e.g., from device 202 to device 204, and from device 204 to device 202. To accomplish this, both device 202 and device 204 both display patterns that encode the information intended for the respective destination device. Devices 202 and 204 can essentially take turns displaying patterns. Each pattern can further encode information acknowledging information received from the prior displayed pattern. For example, device 202 can display a pattern that encodes information intended for device 204, and the pattern can also encode information acknowledging receipt of information from device 204. An example of two-way communications is described below in reference to FIG. 6.

Patterns displayed by device 202 and/or device 204 to encode information can include, for example, bar codes (e.g., Universal Product Codes, a.k.a., "UPC") and matrix barcodes (e.g., QUICK RESPONSE CODES, a.k.a., "QR CODES"). Other types of bar codes, matrix bar codes, and other encoding patterns can be used in addition or in the alternative. For example, patterns that encode information using color, in addition, or in the alternative to black-and-white, can be used.

Patterns displayed by device 202 and/or device 204 can encode data according to a variety of known techniques. Regardless of the technique, each pattern encodes data in a known format. That is, decoding the data of a given pattern proceeds according to known techniques, and produces data in a known sequence. Thus, data encoded according to such patterns can be partitioned into known portions at known virtual locations. Such encoding permits reserving portions of the data for designated purposes. Herein, this is referred to as encoding data in a portion of the pattern.

Devices 202 and 204 can engage in a handshake protocol to establish an information channel prior to sending and/or receiving information content. An example handshake protocol is described in detail below in reference to FIG. 4.

Figure 3:
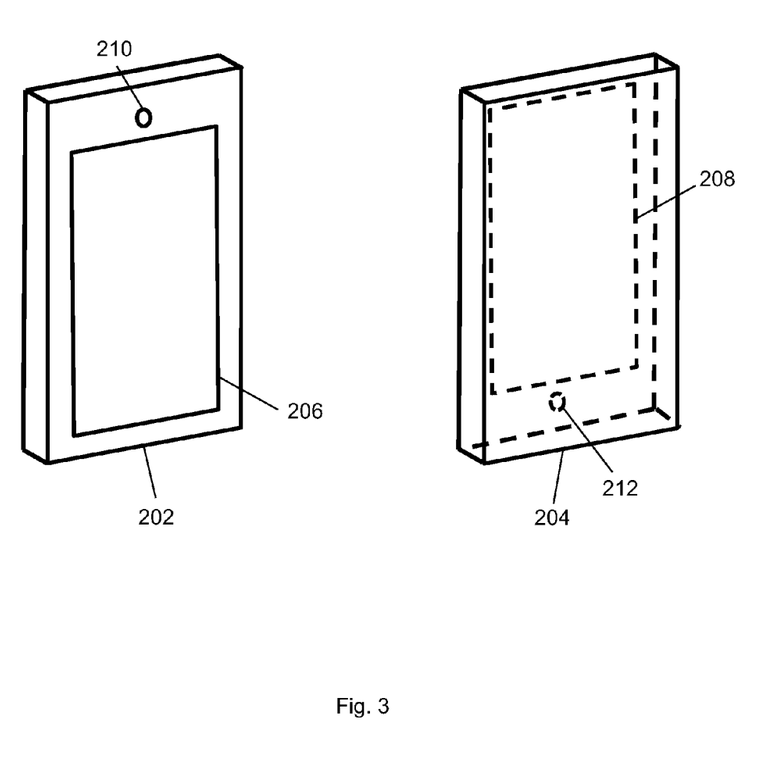
FIG. 3 is a schematic diagram of communicating devices according to some implementations.

FIG. 3 is a schematic diagram of communicating devices according to some implementations. As shown in FIG. 3, device 212 is inverted relative to device 202. Inverting device 212 can serve to better position camera 212 of device 204 relative to display 206 of device 202, and position camera 210 of device 202 relative to display 208 of device 204. That is, inverting one device can allow for better image capture by both devices. In some implementations, inverting one device initiates a handshake protocol, e.g., the protocol described below in reference to FIG. 4. An inverted device can detect that it is inverted using, e.g., an accelerometer such as accelerometer 116 of FIG. 1. Such detection can cause the inverted device to automatically commence a handshake protocol. In implementations where one or both of display 206 and display 208 include a projector, the schematic diagram of FIG. 3 should be interpreted as depicting that camera 210 and/or camera 212 are configured to capture the corresponding projected display.

Figure 4:
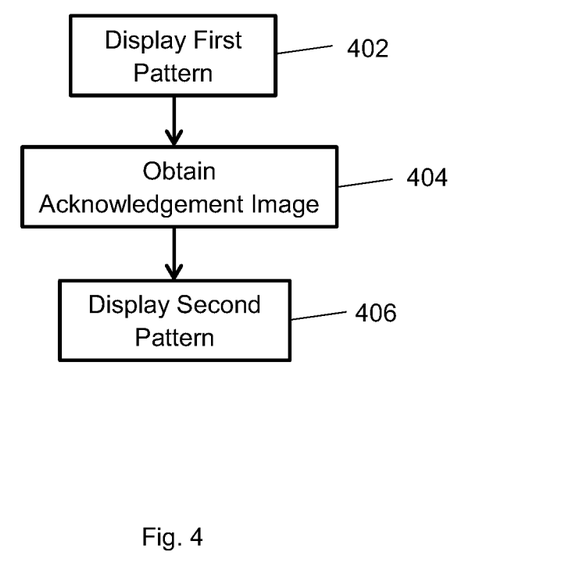
FIG. 4 is a flowchart of a method according to some implementations.

FIG. 4 is a flowchart of a method according to some implementations. In particular, the flowchart of FIG. 4 depicts an example handshake protocol between devices, initiated by a first device, and responded to by a second device. The first device can initiate the method of FIG. 4 upon a user request, e.g., a user activating an application of the first device that utilizes a communication technique as disclosed herein. Alternately, or in addition, the first device can initiate the handshake protocol upon its detection of being inverted, as described above in reference to FIG. 2. Alternately, or in addition, the first device can initiate the handshake protocol upon its detection of being located in a particular geographic region, e.g., a park.

The second device can utilize an intermittent scan of images detected by its respective camera to determine that the first device has requested commencement of a handshake protocol. That is, the second device can periodically detect, e.g., at intervals between 0.01 seconds and 1 second, whether its camera has captured an image that contains a pattern intended to initiate a handshake protocol. In some implementations, the second device can perform such periodic detection continually; in other implementations, the second device can perform such periodic detection upon its detection of being located in a particular geographic region.

At block 402, the first device displays a first pattern intended for image capture by the second device. The first pattern can encode an originator sequence number. The originator sequence number can be zero, one, or a random number, e.g., between 0 and $2^{64}-1$. The first device can select such a random number using, e.g., a true random number generator or a pseudorandom number generator. The originator sequence number can be encoded in a portion of the first pattern reserved for sequence numbers provided by a originating device. The first pattern can encode a flag indicating that the first pattern is part of a handshake protocol. The flag can be encoded in a portion of the pattern reserved for a handshake protocol flag. The first pattern can encode additional information, e.g., information relating to a protocol version.

At block 404, the first device obtains an acknowledgement image displayed by the second device. The acknowledgement image can include a representation of an acknowledgment pattern displayed by the second device. The acknowledgement pattern can encode, as an acknowledgement number, an increment of the originator sequence number, e.g., the initial originator sequence number plus one. The acknowledgement number can be encoded in the portion of the acknowledgment pattern reserved for acknowledgement numbers. The acknowledgement image can further encode a reciprocator sequence number. Similar to the originator sequence number, the reciprocator sequence number can be zero, one, or a random or pseudorandom number, e.g., between 0 and $2^{64}-1$. The reciprocator sequence number can be encoded in the portion of the acknowledgment pattern reserved for sequence numbers provided by a sending device. The acknowledgement pattern can encode a flag indicating that the acknowledgement pattern is part of a handshake protocol. The flag can be encoded in a portion of the pattern reserved for a handshake protocol flag. The acknowledgement pattern can encode additional information, e.g., information relating to a protocol version.

If the first device does not obtain an image containing an acknowledgement image with an incremented originator sequence number within an allotted time, e.g., any predetermined time between one second and 30 seconds, the process of FIG. 4 can terminate.

At block 406, the first device displays a second pattern to the second device. The second pattern can encode an increment of the originator sequence number, e.g., the originator sequence number displayed at block 302 plus one. The increment of the originator sequence number can be encoded in the portion of the second pattern reserved for sequence numbers provided by a sending device. The second pattern can further encode an increment of the reciprocator sequence number, e.g., the reciprocator sequence number plus one. The increment of the reciprocator sequence number can be encoded in the portion of the second pattern reserved for acknowledgement numbers. The second pattern can encode a flag indicating that the second pattern is part of a handshake protocol. The flag can be encoded in a portion of the pattern reserved for a handshake protocol flag. The second pattern can encode additional information, e.g., information relating to a protocol version. The second displayed pattern according to block 306 can also include payload data. The payload data can be encoded in the portion of the second pattern reserved for payload data.

Having displayed the second pattern, the first device completes its portion of the handshake protocol. The first device then awaits further information from the second device. Also at this point, if the second device does not obtain an image containing the second sender pattern as described above within an allotted time, the second device can terminate the handshake protocol of FIG. 4.

The handshake protocol described above in reference to FIG. 4 can be used to begin a two-way communication between devices, e.g., as described below in reference to FIG. 5. In some implementations, the handshake protocol can be used to begin a one-way communication between devices, e.g., as described below in reference to FIG. 6.

Figure 5:
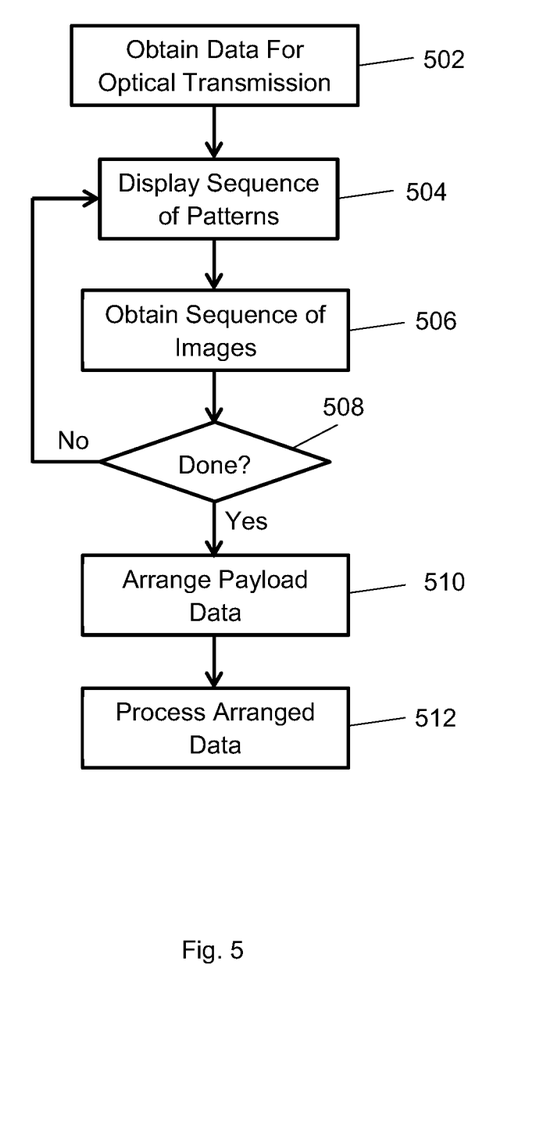
FIG. 5 is a flowchart of a method according to some implementations.

FIG. 5 is a flowchart of a method according to some implementations. The method of FIG. 5 can be used to implement two-way communication between a first device and a second device. In some implementations, the method of FIG. 5 can be preceded by the method described above in reference to FIG. 4.

At block 502, the first device obtains data for optical transmission. The first device can obtain the data internally, externally, or a combination of internally and externally. For example, the first device can obtain data for transmission from an internally stored list of contacts, an internally stored set of images, an internally stored application, etc. The first device can also, or alternately, obtain data for optical transmission from an external source, such as an external hard drive, a network, an application in communication with an external source of data, etc. Once the device identifies the data for optical transmission, control passes to block 504.

At block 504, the first device displays a sequence of patterns. The display of the sequence of patterns can be interleaved with the obtaining of the sequence of images described in relation to block 506. That is, in some implementations, the first device can display one or more patterns according to block 504, then the first device can obtain one or more images according to block 506, after which the process can return to block 504 and repeat until all data has been transmitted and received.

Each displayed pattern according to block 504 can include a sequence number. The sequence number can be encoded in the portion of each pattern reserved for sequence numbers provided by a sending device. The sequence number can, in some implementations, continue the sequence numbering established using the handshake protocol described above in reference to FIG. 4. In other implementations, the sequence numbering can begin at zero, one, or any pseudorandom or random number between 0 and $2^{64}-1$. In some implementations, each pattern can include a different sequence number. For example, each subsequent pattern can include an increment of the prior sequence number, e.g., the prior sequence number plus one, or the prior sequence number plus a number of bytes of payload data included in the prior pattern displayed by the first device. In some implementations, a plurality of patterns can include the same sequence number, e.g., if it is desired to spread information across multiple patterns. In such implementations, each subsequent plurality of patterns can include an increment of the prior sequence number, e.g., the prior sequence number plus one.

Each displayed pattern according to block 504 can also include an acknowledgement number. The acknowledgement number can be encoded in the portion of each pattern reserved for acknowledgement numbers. The acknowledgement number can be an increment of the sequence number of the prior pattern detected in an image of the second device's display, e.g., the sequence number of the latest obtained pattern from block 506 plus one, or the sequence number of the latest obtained pattern from block 506 plus a number of bytes of payload data from the pattern. In some implementations, the numbering of the acknowledgement numbers continues the numbering established during a handshake protocol, e.g., a protocol as described above in reference to FIG. 3. In implementations in which a plurality of displayed patterns according to block 504 include the same sequence number, each such plurality of patterns can include the same acknowledgement number.

Each displayed pattern according to block 504 can also include payload data. The payload data can be encoded in the portion of each pattern reserved for payload data. The payload data, in aggregate, can be sufficient to reconstruct the data for optical transmission obtained at block 502. That is, the payload data from the sequence of patterns of block 504 can encode, either verbatim or indirectly, the data of block 502. Examples of indirect encoding include data that includes error correction or error detection codes, and compressed data.

Each displayed pattern according to block 504 can include a throttle parameter. The throttle parameter can be encoded in a portion of each pattern reserved for the throttle parameter. The throttle parameter can include data that specifies a maximum amount of data to be included in each displayed pattern. For example, some pattern types, such as QR codes, can be configured to include varying amounts of data. If the first device is having difficulty receiving and/or decoding a pattern obtained at block 506 (described below), the first device can enter a smaller throttle parameter in its next displayed pattern. The second device then restricts the payload portion of subsequent patterns to that amount of data.

Each displayed pattern according to block 504 can encode a flag indicating that the pattern is not part of a handshake protocol. The flag can be encoded in a portion of the pattern reserved for a handshake protocol flag.

When the first device has successfully displayed patterns sufficient to encode all data intended for transmission, the first device can display a pattern that encodes a datum that it is finished transmitting. The finish datum can be encoded in a portion of the pattern reserved for such a datum. In some implementations, the datum can be a single bit. Prior to sending a finish datum, the first device can verify that the second device has successfully received all such displayed patterns by checking the second device's acknowledgement numbers. If the second device has displayed a pattern that encodes an acknowledgement number greater than that for the last pattern that the first device used to encode its information, then the second device is likely to have successfully received all data encoded in the prior patterns. That is, if the last acknowledgement number received by the first device exceeds the last sequence number of the last pattern displayed by the first device, then the second device likely successfully received all prior patterns and their encoded information. Upon such a determination, the first device can display a pattern that encodes a finish datum.

At block 506, the first device obtains a sequence of images of patterns displayed by the second device. Again, the images obtained according to block 506 can be interleaved in time with the images displayed according to block 504. That is, the first device can obtain one or more images of patterns displayed by the second device according to block 506, after which the first device can display one or more images according to block 504, and so on, until both devices have displayed images sufficient to encode their respective data for optical transmission.

The first device can include processing to identify the pattern in the obtained image using known techniques, e.g., by removing background imagery. The first device can also include processing to account for relative tilt between the first and second device.

Once the first device obtains a pattern according to block 506, it decodes it to obtain a sequence number. The sequence number can be encoded in the portion of the pattern reserved for sequence numbers provided by a sending device. With each newly displayed pattern, or set of patterns, the second device can increment the sequence number, e.g., by one, or by a number of bytes of payload data included in the prior pattern, or set of patterns, displayed by the second device.

The first device can verify that it has not missed a pattern by comparing the previously-received sequence number to the sequence number of the pattern or patterns received according to block 506. If the first device somehow missed one or more patterns, it can include an acknowledgement number for the missing pattern or patterns in a pattern displayed according to block 504. The second device can re-display the missing pattern or patterns that correspond to the acknowledgement number and can restart its sequential display accordingly.

The first device can also detect an acknowledgement number in the pattern or patterns obtained according to block 506. The acknowledgement number can be encoded in the portion of the pattern reserved for acknowledgement numbers provided by a sending device. If the acknowledgement number does not match the acknowledgement number for the next pattern or patterns that the first device will display according to block 504, the first device can re-display any intervening patterns so that the second device obtains a complete set of data.

Each obtained pattern according to block 506 can also include payload data. The payload data can be encoded in the portion of each pattern reserved for payload data. The payload data, in aggregate, can be sufficient to reconstruct data that the second device intends to send. That is, the payload data from the sequence of patterns of block 506 can encode, either verbatim or indirectly, a data set from the second device. Examples of indirect encoding include data that includes error correction or error detection codes, and compressed data.

Each obtained pattern according to block 506 can include a throttle parameter. The throttle parameter can be encoded in a portion of each pattern reserved for the throttle parameter.

The throttle parameter can include data that specifies a maximum amount of data to be included in each displayed pattern. If a throttle parameter is present in a pattern, the first device can restrict the payload portion of subsequent patterns to that amount of data.

Each obtained pattern according to block 506 can encode a flag indicating that the pattern is not part of a handshake protocol. The flag can be encoded in a portion of the pattern reserved for a handshake protocol flag.

At block 508, the first device determines whether to continue. Such a determination can take into account both whether the first device has successfully transmitted the data obtained at block 502, and whether the first device has successfully received all data that the second device intends to receive.

To determine whether the first device has successfully transmitted all of the data obtained at block 502, the first device can track whether its displayed succession of patterns have encoded the entirety of such information, as well as whether it has displayed a pattern that encodes a finish datum.

To determine whether the first device has successfully received all data that the second device intends to transmit, the first device can check whether it has obtained an image containing a pattern that includes a finish datum. The first device can also check that it has successfully received patterns that include all sequence numbers of the second device between a first such sequence number and a sequence number of the pattern that encodes the finish datum.

If either the first device is not finished transmitting data, or the second device is not finished transmitting data, then control can pass from block 508 to block 504 until both conditions are present. Note that if either device finishes transmitting before the other device, it can either continue to displayed patterns that include appropriate sequence and acknowledgement numbers, but with empty payloads, or continue to obtain patterns, without displaying responsive patterns.

At block 510, the first device arranges the payload data encoded by the patterns obtained from the second device. Such arrangement can include, for example, decoding the patterns to obtain the payload data, and arranging the multiple portions of payload data in memory so as to form a cohesive set of data.

At block 512, the first device processes the arranged data. Such processing can include, for example, executing the data, processing error correction codes, processing error detection codes, decompressing, and other techniques used to convert the encoded data to usable data.

Figure 6:
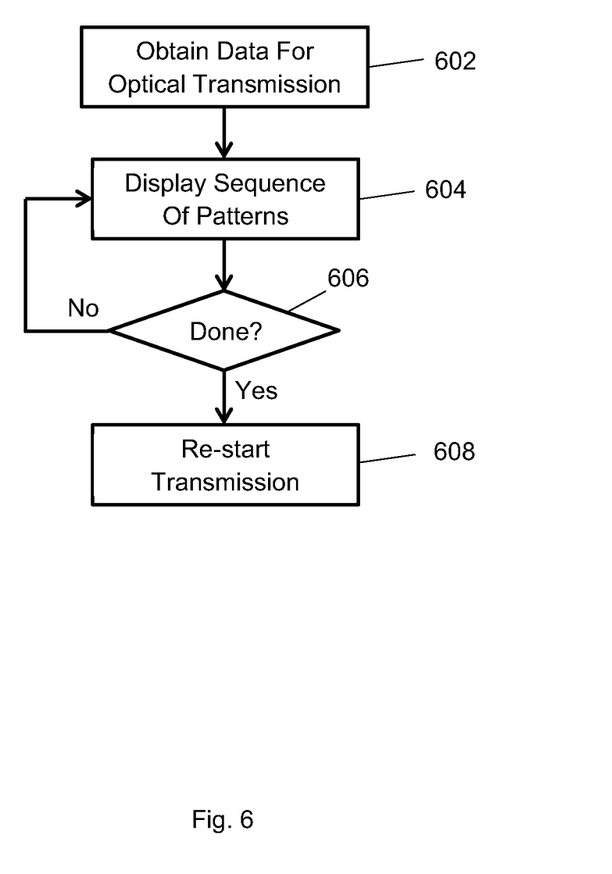
FIG. 6 is a flowchart of a method according to some implementations.

FIG. 6 is a flowchart of a method according to some implementations. The method of FIG. 6 can be used to implement one-way communication between a first device and one or more second devices. That is, the method of FIG. 6 can be used to broadcast data. The first device can be mobile of fixed. In some implementations, the method of FIG. 6 can be preceded by the method described above in reference to FIG. 4.

At block 602, the first device obtains data for optical transmission. This block is similar to block 502 of FIG. 5.

At block 604, the first device displays a sequence of patterns. Each displayed pattern according to block 604 can include a sequence number. The sequence number can be encoded in the portion of each pattern reserved for sequence numbers provided by a sending device. The sequence number can, in some implementations, continue the sequence numbering established using the handshake protocol described above in reference to FIG. 4. In other implementations, the sequence numbering can begin at zero, one, or any pseudo-random or random number between 0 and $2^{64}-1$. In some implementations, each pattern can include a different sequence number. For example, each subsequent pattern can include an increment of the prior sequence number, e.g., the prior sequence number plus one. In some implementations, a plurality of patterns can include the same sequence number, e.g., if it is desired to spread information across multiple patterns. In such implementations, each subsequent plurality of patterns can include an increment of the prior sequence number, e.g., the prior sequence number plus one.

Each displayed pattern according to block 604 can also include payload data. The payload data can be encoded in the portion of each pattern reserved for payload data. The payload data, in aggregate, can be sufficient to reconstruct the data for optical transmission obtained at block 602. That is, the payload data from the sequence of patterns of block 604 can encode, either verbatim or indirectly, the data of block 602. Examples of indirect encoding include data that includes error correction or error detection codes, and compressed data.

Each displayed pattern according to block 604 can encode a flag indicating that the pattern is not part of a handshake protocol. The flag can be encoded in a portion of the pattern reserved for a handshake protocol flag.

When the first device has successfully displayed patterns sufficient to encode all data intended for transmission, the first device can display a pattern that encodes a datum that it is finished transmitting. The finish datum can be encoded in a portion of the pattern reserved for such a datum. In some implementations, the datum can be a single bit.

At block 606, the first device determines whether to continue. Such a determination can take into account whether the first device has successfully transmitted the data obtained at block 502. To determine whether the first device has successfully transmitted all of the data obtained at block 502, the first device can track whether its displayed succession of patterns have encoded the entirety of such information, as well as whether it has displayed a pattern that encodes a finish datum. If the first device is not finished transmitting data, then control can pass from block 606 to block 604 until it has finished. If the first device has finished transmitting, then control passes to block 608.

At block 608, the first device re-starts the transmission process beginning at block 604. This allows the first device to continually transmit that data it obtains at block 602. Note that block 608 is optional; that is, in some implementations, the method of FIG. 6 concludes upon a "yes" determination at block 606.

In some implementations, the first device continually displays patterns that encode payload data according to a known digital fountain format. Such a digital fountain format allow for reconstruction of the data for optical transmission of block 602 based on a data encoded in subset of obtained patterns. That is, a digital fountain format allows for redundant payload data.

In general, systems capable of performing the presented techniques may take many different forms. Further, the functionality of one portion of the system may be substituted into another portion of the system. Each hardware component may include one or more processors coupled to random access memory operating under control of, or in conjunction with, an operating system. Further, each hardware component can include persistent storage, such as a hard drive or drive array, which can store program instructions to perform the techniques presented herein. That is, such program instructions can serve to perform the disclosed methods. Other configurations of the first and second devices as discussed herein, and other hardware, software, and service resources are possible.

The foregoing description is illustrative, and variations in configuration and implementation are possible. For example, resources described as singular can be plural, and resources described as integrated can be distributed. Further, resources described as multiple or distributed can be combined. The scope of the presented techniques is accordingly intended to be limited only by the following claims.

What is claimed is:

1. A method comprising:
    displaying by a first device a first sender pattern, the first sender pattern representing data comprising a first sender sequence number;
    obtaining, by the first device, an acknowledgement image displayed by a second device, wherein the acknowledgement image comprises a first receiver pattern, the first receiver pattern representing data comprising a function of the first sender sequence number and a first receiver sequence number;
    displaying by the first device a second sender pattern, the second sender pattern representing data comprising a function of the first receiver sequence number and a function of the first sender sequence number;
    displaying by the first device a sequence of sender patterns, each sender pattern representing data comprising a sender sequence number, a sender acknowledgement number, and sender payload data;
    obtaining, by a camera of the first device, a sequence of images displayed by the second device, wherein each image comprises a receiver pattern representing data comprising a receiver sequence number, a receiver acknowledgement number and receiver payload data;
    arranging, based on corresponding receiver sequence numbers, receiver payload data from a plurality of receiver patterns to form received data; and
    processing the received data at the first device.

2. The method of claim 1, wherein each sender pattern comprises one of a matrix code and a bar code.

3. The method of claim 1, further comprising:
    detecting, by the first device, that the first device is inverted; and
    initiating the displaying by the first device a first sender pattern, the obtaining, by the first device, an acknowledgement image displayed by the second device, and the displaying by the first device a second sender pattern in response to the detecting.

4. The method of claim 3, wherein the first device comprises an accelerometer, wherein the detecting that the device is inverted comprises monitoring a signal from the accelerometer.

5. The method of claim 1, further comprising:
    detecting, by the first device, that the first device is in a predetermined geographic region; and
    initiating the displaying by the first device a first sender pattern, the obtaining, by the first device, an acknowledgement image displayed by the second device, and the displaying by the first device a second sender pattern in response to the detecting.

6. The method of claim 5, wherein the first device comprises a GPS module, wherein the detecting that the device is in a predetermined geographic region comprises monitoring a signal from the GPS module.

7. The method of claim 1, further comprising:
    obtaining data for optical transmission;
    wherein the sender payload data for the sequence of sender patterns comprises data sufficient to determine the data for optical transmission.

8. The method of claim 1, wherein the processing comprises at least one of: error detecting, decompressing, and executing.

9. The method of claim 1, wherein the sequence of sender patterns comprises a pattern comprising a throttle parameter.

10. The method of claim 1, further comprising detecting that the sequence of images displayed by the second device comprise a receiver pattern comprising a throttle parameter indicating an amount, wherein subsequent sender patterns comprise sender payload data not exceeding the amount.

11. The method of claim 1, wherein at least one of the first device and the second device comprise a mobile phone.

12. A method comprising:
    displaying by a first device a first sender pattern, the first sender pattern representing data comprising a first sender sequence number;
    obtaining, by the first device, an acknowledgement image displayed by a second device, wherein the acknowledgement image comprises a first receiver pattern, the first receiver pattern representing data comprising a function of the first sender sequence number and a first receiver sequence number;
    displaying by the first device a second sender pattern, the second sender pattern representing data comprising a function of the first receiver sequence number and a function of the first sender sequence number;
    obtaining data for optical transmission; and
    displaying by a first device a sequence of patterns, each pattern representing data comprising payload data;
    wherein a subset of the sequence of patterns comprises payload data sufficient to determine the data for optical transmission, the subset comprising a plurality of patterns.

13. The method of claim 12, wherein each pattern comprises one of a matrix code and a bar code.

14. The method of claim 12, further comprising repeating the displaying at least once.

15. The method of claim 12, wherein the payload data comprises data in a digital fountain format.

16. The method of claim 12, further comprising, prior to the displaying, detecting that a second device is inverted.

17. The method of claim 12, further comprising, prior to the displaying, detecting that a second device is in a predetermined geographic region.

18. The method of claim 12, wherein each pattern represents data comprising a sequence number.

19. Computer readable media containing instructions which, when executed by one or more processors of a first device, cause the one or more processors to:
    display by the first device a first sender pattern, the first sender pattern representing data comprising a first sender sequence number;
    obtain, by the first device, an acknowledgement image displayed by a second device, wherein the acknowledgement image comprises a first receiver pattern, the first receiver pattern representing data comprising a function of the first sender sequence number and a first receiver sequence number;
    display by the first device a second sender pattern, the second sender pattern representing data comprising a function of the first receiver sequence number and a function of the first sender sequence number;
    display by the first device a sequence of sender patterns, each sender pattern representing data comprising a sender sequence number, a sender acknowledgement number, and sender payload data;

obtain, by a camera of the first device, a sequence of images displayed by the second device, wherein each image comprises a receiver pattern representing data comprising a receiver sequence number, a receiver acknowledgement number and receiver payload data;

arrange, based on corresponding receiver sequence numbers, receiver payload data from a plurality of receiver patterns to form received data; and process the received data at the first device.

* * * * *